US012006745B2

(12) United States Patent
Tallent

(10) Patent No.: US 12,006,745 B2
(45) Date of Patent: Jun. 11, 2024

(54) DOOR SECURITY KIT AND METHOD FOR PREVENTING FORCEFUL OPENING OF A DOOR

(71) Applicant: Jeffrey W Tallent, Griffin, GA (US)

(72) Inventor: Jeffrey W Tallent, Griffin, GA (US)

( * ) Notice: Subject to any disclaimer, the term of this patent is extended or adjusted under 35 U.S.C. 154(b) by 449 days.

(21) Appl. No.: 16/790,180

(22) Filed: Feb. 13, 2020

(65) Prior Publication Data

US 2020/0291700 A1 Sep. 17, 2020

Related U.S. Application Data

(63) Continuation-in-part of application No. 16/355,077, filed on Mar. 15, 2019, now abandoned.

(51) Int. Cl.

*E05B 15/02* (2006.01)
*E05B 19/18* (2006.01)
*E05C 19/18* (2006.01)
*G07C 9/00* (2020.01)

(52) U.S. Cl.

CPC ........ *E05C 19/184* (2013.01); *E05B 15/0205* (2013.01); *G07C 9/00904* (2013.01)

(58) Field of Classification Search

CPC ............... E05C 19/184; E05B 15/0205; E05Y 2900/132; Y10T 70/30; Y10T 70/40; Y10T 70/333; Y10T 70/5168; Y10T 70/5199; Y10T 70/5204; Y10T 70/7102; Y10T 70/7107

See application file for complete search history.

(56) References Cited

U.S. PATENT DOCUMENTS 4,893,854 A * 1/1990 Dietrich ................ E05B 15/022 292/341.12
5,118,151 A * 6/1992 Nicholas, Jr. ....... E05B 15/0245 292/341.19
5,549,338 A * 8/1996 Wingfield ............ E05C 19/184 292/295
5,772,265 A * 6/1998 Gilbert ...................... E05C 3/04 292/210
6,641,185 B2 * 11/2003 Hale ..................... E05C 19/184 292/289
9,127,489 B2 9/2015 Orlov
10,041,273 B2 8/2018 Diegue (Continued)

*Primary Examiner* — Michael P Ferguson
*Assistant Examiner* — Thomas L Neubauer
(74) *Attorney, Agent, or Firm* — J. T. Hollin, Jr. Attorney at Law P.C.

(57) ABSTRACT

Disclosed is a door security kit comprising (1) a metallic cuboid compartment, (2) a door guard assembly, and (3) an ASA/ANSI modified strike plate, the modified strike plate constructed with a top notch, a bottom notch, and an elongated lip. The metallic compartment further manifests a rear planar panel, having an adjustable channel cutout. A mortise cylinder mounted externally to one surface of the compartment connects to a tailpiece at one end with a keyway extending therethrough. Rotation of the keyway operates the tailpiece and a connected rod, the rod moving metallic plates to control the size of the adjustable channel. Decreasing the length of the adjustable channel causes the channel to clamp onto the notches of the strike plate, preventing movement of the door bolt from its insertion within the modified strike plate. The door, and the strike plate, are both housed and operate within a doorjamb.

10 Claims, 10 Drawing Sheets

(56) References Cited

U.S. PATENT DOCUMENTS

Figure 1:
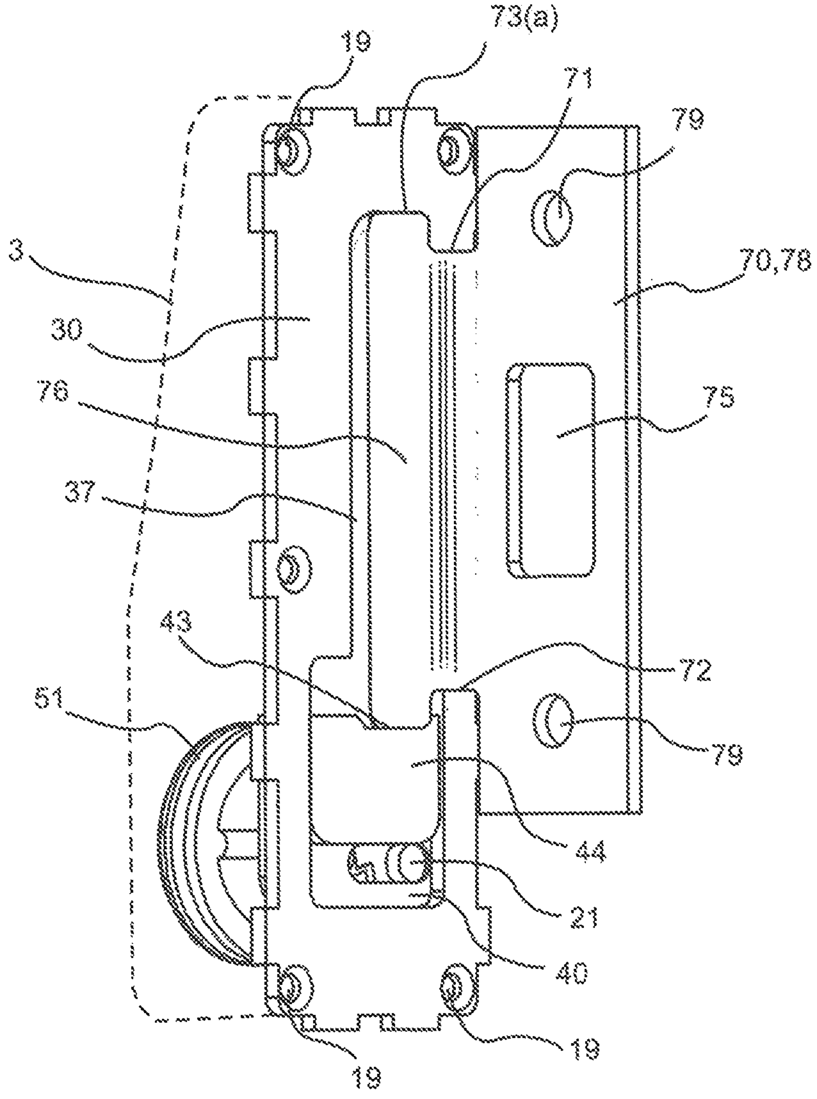

| | | | | |
|---|---|---|---|---|
| 10,072,455 | B2 | 9/2018 | Smith | |
| 10,125,526 | B2 | 11/2018 | Mahoney et al. | |
| 10,151,127 | B1 | 12/2018 | Shell | |
| 10,253,525 | B2 * | 4/2019 | Hunt | E05B 17/2003 |
| 2014/0245798 | A1 * | 9/2014 | Beckman | E05B 13/002 70/14 |
| 2014/0247113 | A1 * | 9/2014 | Paquin | G07C 9/00174 340/5.65 |

* cited by examiner

Exhibit A

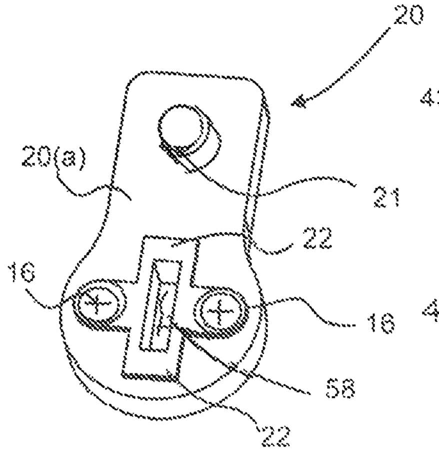
Fig. 12
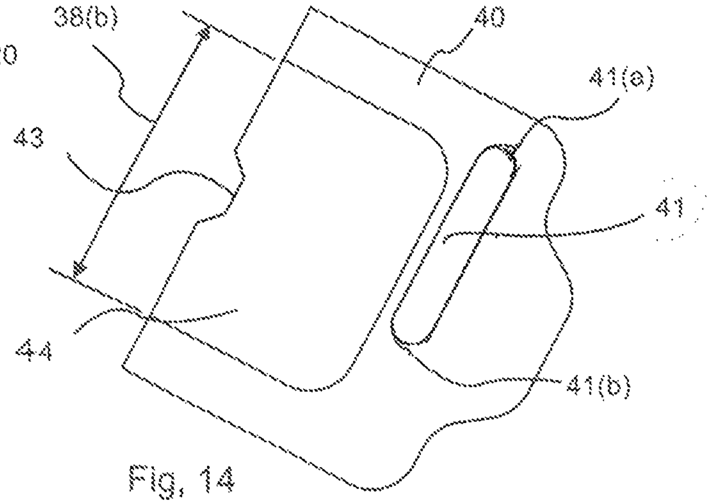
Fig, 14
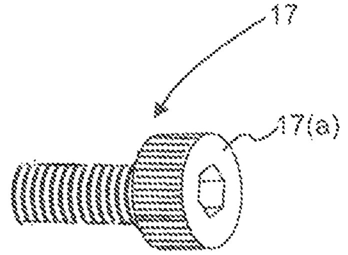
Fig, 13
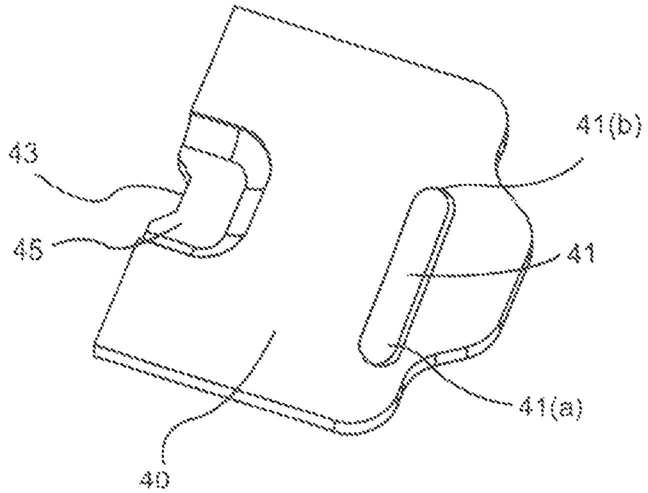
Fig. 15
Exhibit B

DOOR SECURITY KIT AND METHOD FOR PREVENTING FORCEFUL OPENING OF A DOOR

CROSS-REFERENCES TO RELATED APPLICATIONS

This patent application is a continuation-in-part of U.S. non-provisional patent application Ser. No. 16/355,077 filed on Mar. 15, 2019, and further, claims the benefit and content of U.S. patent application Ser. No. 16/355,077 as though fully appearing herein.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

(1) Field of the Invention

The field of the present inventive concept relates generally to methods and equipment utilized to provide an ultra-strong door protective device that can be readily locked by a threatened user from inside the room to be secured. The April 2007 shooting at Virginia Tech has been one of the numerous violent incidents of a deranged shooter breaching a door within a school, business, or other facility and committing deadly mayhem upon the occupants of one or more rooms.

In particular, classroom doors are usually not constructed with a heavy-duty, reinforced locking device that may be put in place and secured from inside a threatened room. Therefore, students and school staff personnel are not able to quickly buttress the door against forced opening as a protective measure. As a result, an assailant has no difficulty breaking into the room, whether the room is a school classroom or a commercial office. The present inventive concept discloses a door security device comprising a portable, lockable metal compartment which engages a corresponding metal, notched strike plate, the strike plate being mounted to a metal door frame which is enveloped within the wall.

(2) Description of the Related Art, Including Information Disclosed Under 37 CFR 1.97 and 1.98

U.S. Pat. No. 10,072,455; Smith; Sep. 11, 2018. A temporary door latch device for a pre-hung door and casing. The door has a door lock cylinder opening and a door latch opening and the casing has a latch bolt opening. The device includes a female portion having a pair of opposed and spaced apart resilient fingers, each of said fingers having a plurality of inwardly extending teeth thereon. The female portion is receivable in the door lock cylinder opening and the door latch opening. The male portion has a pair of opposed and spaced apart fingers, each of the fingers having a plurality of teeth thereon. The male portion is receivable in the latch bolt opening and the door latch opening. The teeth on the female portion engage the teeth on the male portion in one orientation and are disengaged in another orientation.

U.S. Pat. No. 10,151,127; Shell, R.; Dec. 11, 2018. The present invention relates to a keyless portable lock for a door. The portable door lock includes a horizontal bar that lays across the door and/or the door frame and a strap with one or more holes. The user pulls on the strap, closes the door and inserts a rod through the one or more strap holes so that the rod lays across the door and the frame on the opposite side of the door as the horizontal bar. This action will prevent the door from being opened. A transverse bar may extend from the horizontal bar at approximately 90 degree angle so that the portable door lock is generally in the shape of an "L."

U.S. Pat. No. 10,125,526; Mahoney, et. al.; Nov. 13, 2018. A door security apparatus is disclosed herein. The door security apparatus comprises a sleeve member, a door engagement member and a spacer, and is configured to engage a double-lever arm door closer to allow for the locking of a door from the inside. The apparatus further comprises a locking mechanism for keeping the apparatus attached to the door closer. The door engagement member is configured to engage the top edge of a door, the sleeve member is configured to slidably engage the double-lever arm door closer, and the spacer is configured to connect the door engagement member and the sleeve member.

U.S. Pat. No. 10,041,273; Dieguez, R.; Aug. 7, 2018. An auxiliary lock for preventing a hinged door from opening all the way is provided. The lock comprises a strike plate, a flip lock plate, a catching member to receive a door knob or handle, and a means for connecting the catching member and flip lock plate. In an embodiment, the strike plate may be configured to replace any standard strike plate disposed on an inside portion of a door jamb, and the flap lock plate may longitudinally extend from a hinged connection with strike plate in the direction of an opening door so as to optionally block the door from opening and avoid obstructing a swinging door when disengaged. In use, the catching member may be placed around the door knob or handle so that the means for connecting the catching member and flip lock plate form an inseparable link between the door jamb and door itself.

U.S. Pat. No. 9,127,489; Orlov, et. al.; Sep. 8, 2015. A door stop includes a body having a longitudinal axis and a rotating toggle operably connected to the body. The toggle is rotatable such that a longitudinal axis of the toggle aligns with the longitudinal axis of the body in an insertion position and the longitudinal axis of the toggle is transverse to the longitudinal axis of the body in a locked position. The door stop includes a lock assembly operably mounted to the body to lock the toggle. Monitoring circuitry provides indication of a location of the door stop and/or an alarm mode.

U.S. Published patent application Ser. No. 16/355,077; Tallent, J. Mar. 15, 2019

A door security kit comprising (1) a door guard assembly and (2) a modified strike plate, constructed with a top notch and bottom notch. The door guard assembly manifests a cuboid-shaped compartment comprising a rear vertical panel, having an adjustable channel. A mortise cylinder mounted internally to the compartment consists of a modified cam and lever arm on one end and a key way on the opposite. The mortise cylinder, connected to a locking/unlocking mechanism, when rotated by a key, operates a mechanism which controls the size of the adjustable channel. The protecting door, and the strike plate, are both housed and operate within a commercial door frame. Turning of the mortise cylinder to the locked configuration causes the mechanism to decrease the length of the channel, thereby causing the channel to clamp onto the notches of the strike plate, preventing movement of the door within the doorframe.

BRIEF SUMMARY OP THE INVENTION

The primary function of the disclosed inventive concept is the operation of a door security kit utilizing the construction of a modified ASA/ANSI strike plate mounted on a doorframe wherein a strengthened portion of the modified strike plate, upon door closure, protrudes into a protected room. A corresponding portable metal structure then positions integral mechanical components to rigidly clamp onto the protruding portion of the modified strike plate. The clamping action prevents the withdrawal of the door's bolt from within the bolt hole of the modified strike plate, as an outer surface of the metal structure simultaneously abuts both the door and the associated door frame. Thus, the door is rendered essentially unopenable, providing refuge to the occupants of the protected room.

The disclosed security device herein, referred to as a Door Security Kit 1, comprises an ASA/ANSI modified strike plate 70 having an elongated lip 76, a cuboid metal compartment 3, door guard assembly 2, and a compartment 3 hanger 90. The Door Security Kit 1, similar to the concept discussed above, prevents the opening of a door 60 which is mounted in a metal doorframe leading to a protected room. Such an extreme protective arrangement is necessary, considering the frequent occurrences of circumstances of an turned shooter(s) firing through doors, or door closing systems, endangering the lives of the occupants of a classroom or a commercial business office.

The external, reinforced component of the door security kit 1 consists of the cuboid-shaped metal compartment 3. In the preferred embodiment, the compartment 3 further comprises three basic parts: a housing 80, a top plate 10, and a bottom plate 30. The compartment 3 is fabricated using, in the preferred embodiment, SAE 304 stainless steel. The top plate 10 manifests a circular opening 14 which permits rigid installation of a mortise cylinder 51 and associated spacers 50, shown in FIG. 2, FIG. 2A, FIG. 5, FIG. 6.

Figure 7:
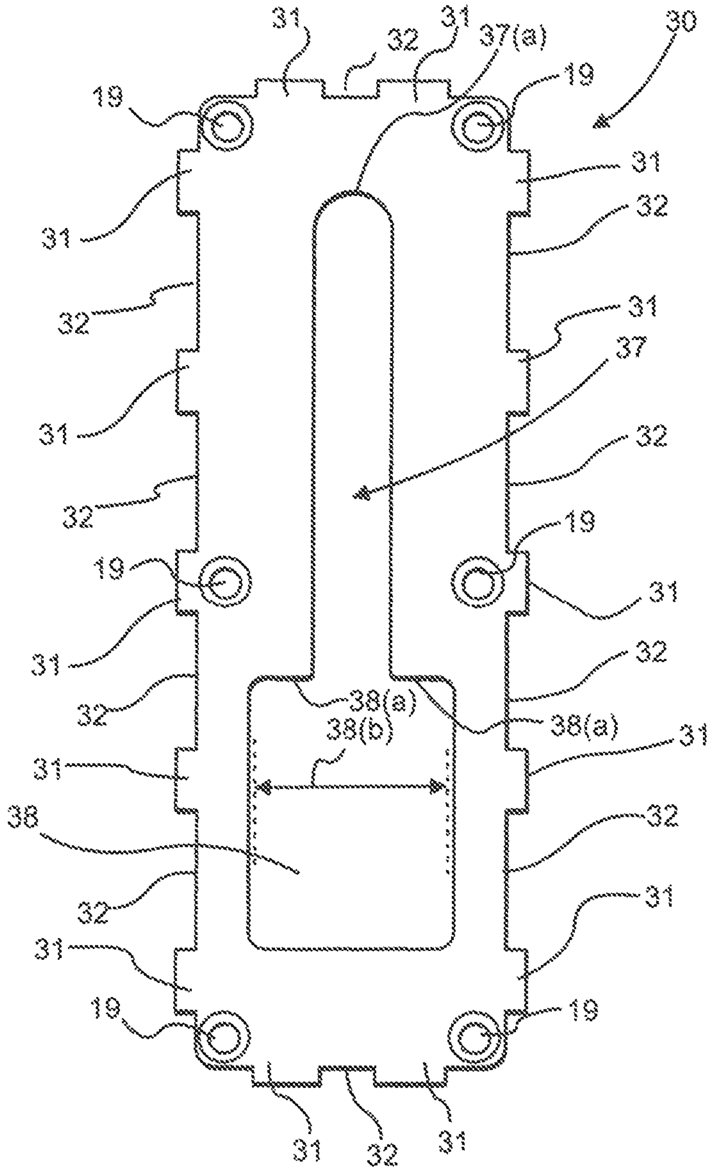
Figure 7A:
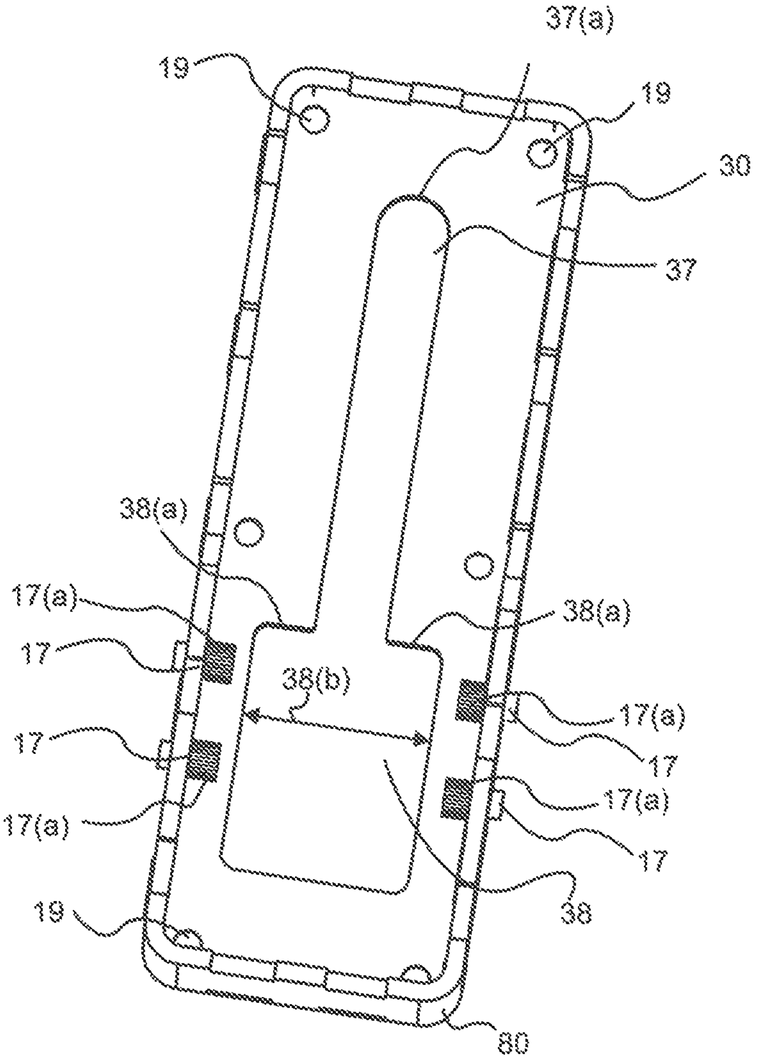

The bottom plate 30 of the compartment 3 features a vertically-oriented upper channel cutout 37 which transitions into a wider, rectangular shaped lower bay cutout 38, as shown in FIG. 7 and FIG. 7A. The compartment 3 works in conjunction with a modified metal strike plate 70. The modified strike plate 70 must be installed within the door frame 68 which encompasses a door 60 leading to the protected room, which must be fortified from break-in.

A standard control key 57 and keyway 58 are used to operate the mortise cylinder 51, the mortise cylinder 51 being permanently attached within the top plate 10 of the compartment 3. The door 60 which is to be secured, in the preferred embodiment, is housed, and operates within, a commercial metal door frame 68.

The aforementioned mortise cylinder 51, when turned by the control key 57, activates a mechanism to modify the internal dimension of the adjustably-sized channel cutout 37. The channel cutout 37, in its locked configuration, functions by clamping onto the elongated lip 76 of the modified strike plate 70, thereby preventing opening of the subject door out of the doorframe. FIG. and FIG. 10 exhibit the unlocked and locked configuration, respectively, of the bottom plate 30.

Figure 3:
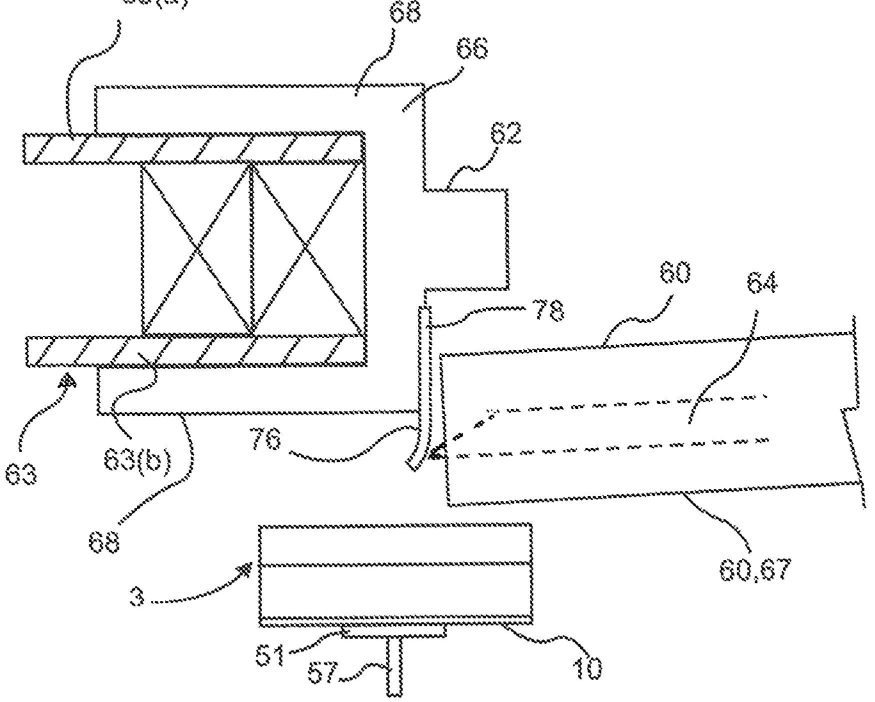
Figure 16:
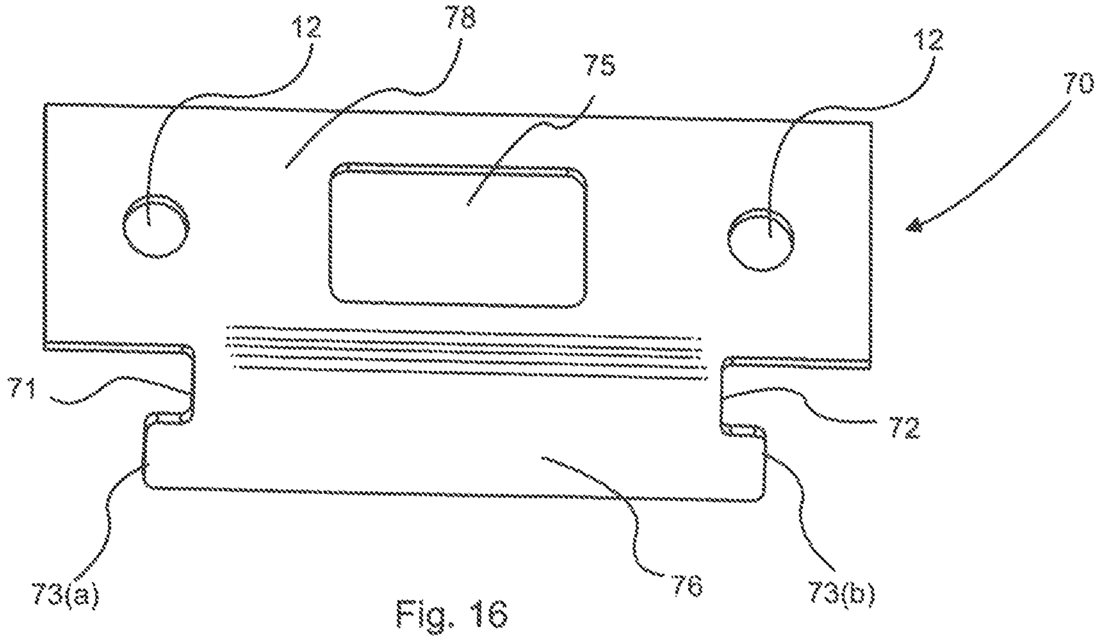
Figure 17:
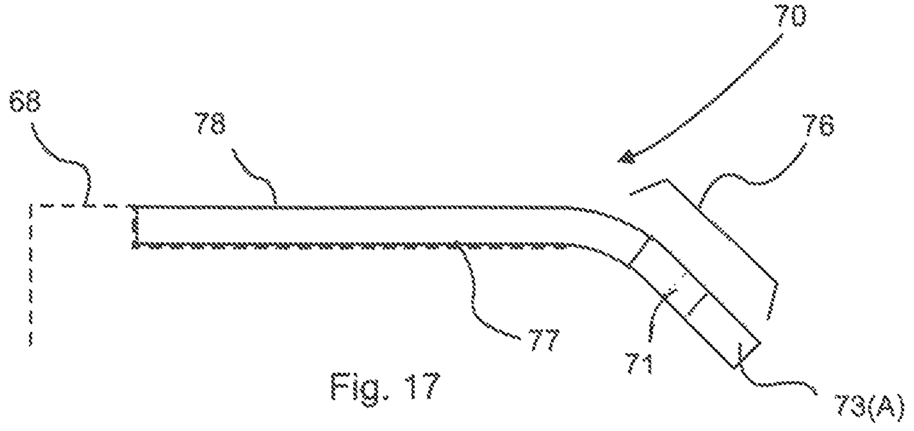

The modified strike plate 70, shown in FIG. 1, FIG. 16, and FIG. 17, is also of SAE 304 stainless steel, at least 0.125 inch thick. The modified strike plate 70 features a vertically-oriented elongated lip 76 which, when installed within a doorframe 68 and door jamb, protrudes approximately 1 to 2 inches from the doorframe 68 and into the protected room. This designed protrusion is more readily seen in FIG. 3. The modified strike plate 70 conforms to ASA and ANSI standards, and, in the preferred embodiment, is installed in the door frame 68 within which the protecting door 60 is hung To provide strengthened resistance to an attempted forced opening of a protecting door 60, the first step by a user is to close the protecting door 60, whereby the elongated lip 76 of the modified strike plate 70 is caused to protrude into the room. Next, the user places the upper channel cutout 37 of the compartment 3 oriented in a loosely-clamped position surrounding the upper shoulder 73(*a*) and lower shoulder 73(*b*) of the elongated lip 76 of the modified strike plate 70. The pending closure of a do or 60 is illustrated in FIG. 3.

The key 57 of the mortise cylinder 51 is then turned (approximately 120 degrees) to the locked position, where the neck 37(*a*) of the upper channel cutout 37 of the bottom plate 30 and a flange 45 on a reinforcing brace 44 reduces the channel cutout 37 to its minimum dimension. This reduction to minimum dimension thereby forces the upper channel cutout 37 into a rigid clamp against both the upper notch 71 and lower notch 72 of the modified strike plate 70. This is the only circumstance where the key 57 may be removed from the compartment 3 of the door security device 1.

Physical tests have demonstrated that vigorously swinging a 750-pound weight against a test door 60 cannot budge the compartment 3 and its upper channel 37 from the clamped configuration about the elongated lip 76, the protected room 63, thereby remaining safe from forced entry.

BRIEF DESCRIPTION OF THE VIEWS OF DRAWINGS AS EXEMPLARY EMBODIMENTS OF THE INVENTIVE CONCEPT

FIG. 1 is a stylized partial view of the operation of a Door Security Kit 1, showing a modified strike plate 70 attached to the doorframe 68 constructed within a wall 63 and having a supporting door stop 62. Further, the channel cutout 37 of the bottom plate 30 of the compartment 3 (the outline of which is shown by dashed lines) is depicted in the process of being placed about the top notch 71 and bottom notch 72 of the modified strike plate 70.

Figure 2:
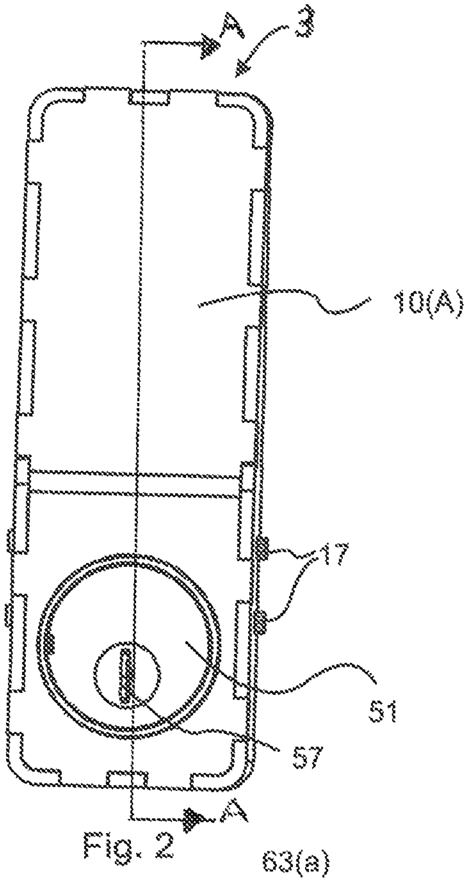

FIG. 2 illustrates a head-on view of the outer surface 10(*a*) of the compartment 3, further showing the mortise cylinder lock 51, and the control key 57 inserted.

Figure 2A:
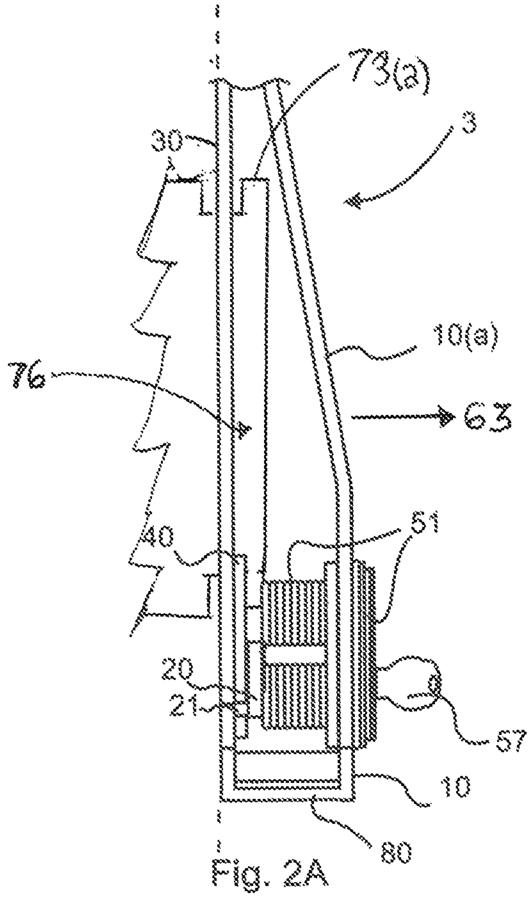

FIG. 2A is a cutaway view of the compartment 3 of the door security kit 1, further showing the mortise cylinder 51, cylinder spacers 50, the tailpiece 20, a movable rod 21, the slide 40 and its conjoined reinforcing brace 44. The rod 21 is shown as having moved the slide 40 upward toward its locking position against the channel cutout 37 (not shown). The extended lip 76 is shown clamped within the confines of the compartment 3.

FIG. 3 displays an overhead view of the compartment 3 just prior to the protecting door 60 being moved into a fully closed position against the door stop 62, at which time the channel cutout 37 of the compartment 3 will be placed onto the elongated lip 76 and outer faceplate 78 of the modified strike plate 70, which is attached to a doorframe 68 adjoining the protected room 63.

Figure 4:
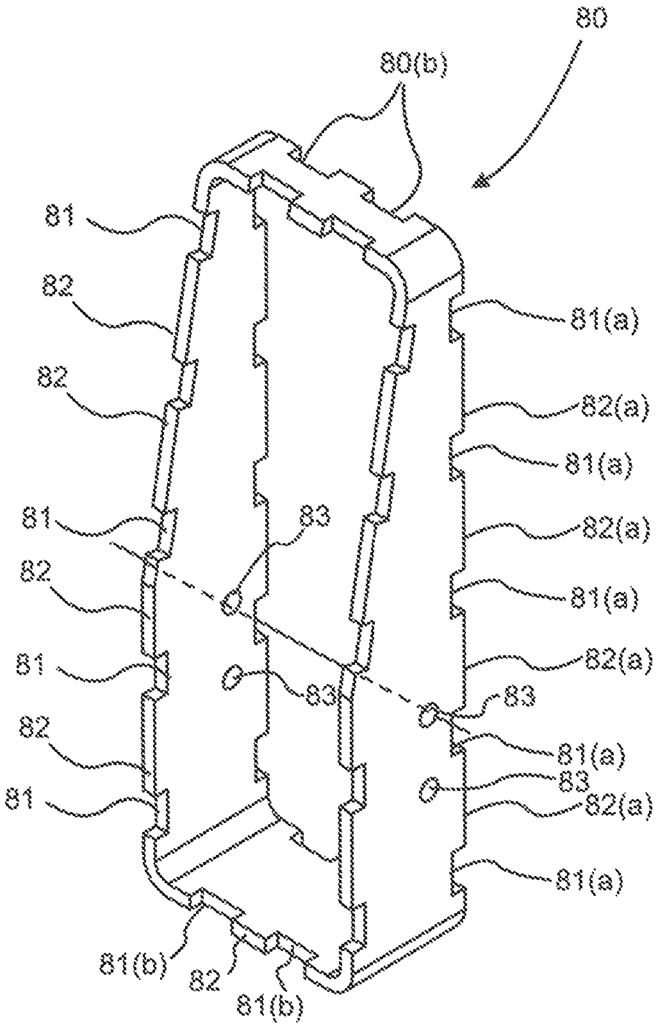

FIG. 4 presents a standalone perspective view of the housing 80, which forms the main structural component of the compartment 3.

Figure 5:
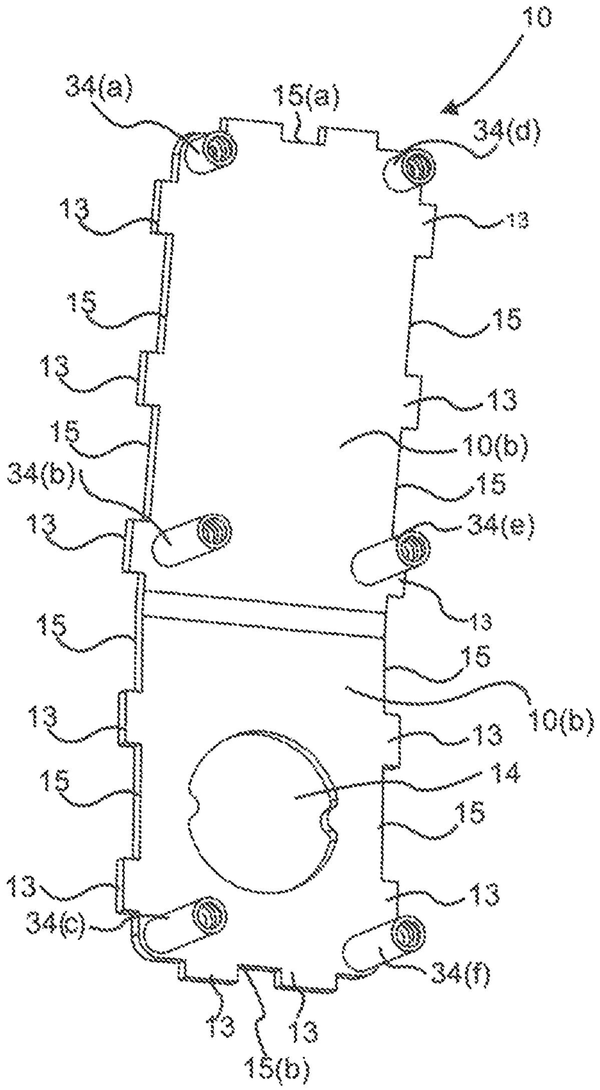

FIG. 5 displays a perspective view of the inner surface 10(*b*) of the top plate 10 component. As shown, the left and right edges of the top plate 10 feature a continuously, alternating pattern of labs 13 and side gaps 15, including upper and lower gaps 15(*a*)(*b*). Further shown are a plurality of bolsters 34(*a*)-(*f*), all having internally threaded apertures.

Figure 6:
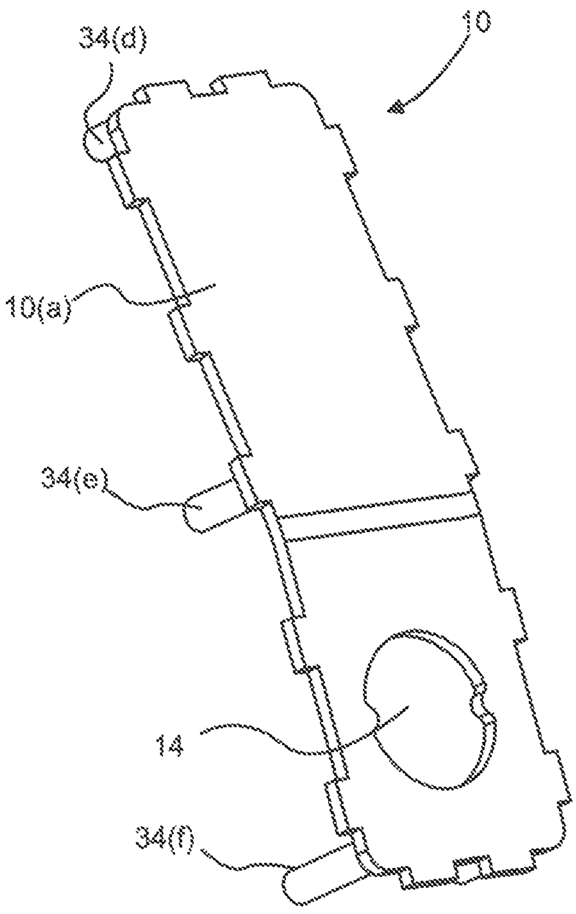

FIG. 6 illustrates a three-dimensional view of the top plate 10 of the compartment 3, further showing the circular opening 14 used to attach the mortise cylinder 51 onto the outer surface 10(*a*) top plate 10.

FIG. 7 presents a view of the outer surface of the bottom plate 30 component of the compartment 3. The edges of the bottom plate 30, manifest alternating tabs 31 and hollows 32. Further shown is the adjustably-sized channel cutout 37 and the wider bay cutout 38. The width 38(*b*) of the bay cutout 38 corresponds to the width of the reinforcing brace 44 component of the door guard assembly 2.

FIG. 7A is an internal view of the housing 80, superimposed atop the bottom plate 30. Two pairs of co-axial cylinder head setscrews 17, having knurled edges 17(*a*) are shown. Also visible is the adjustably-sized channel cutout 37, its rounded neck 37(*a*), and the extended bay cutout 38.

Figure 8:
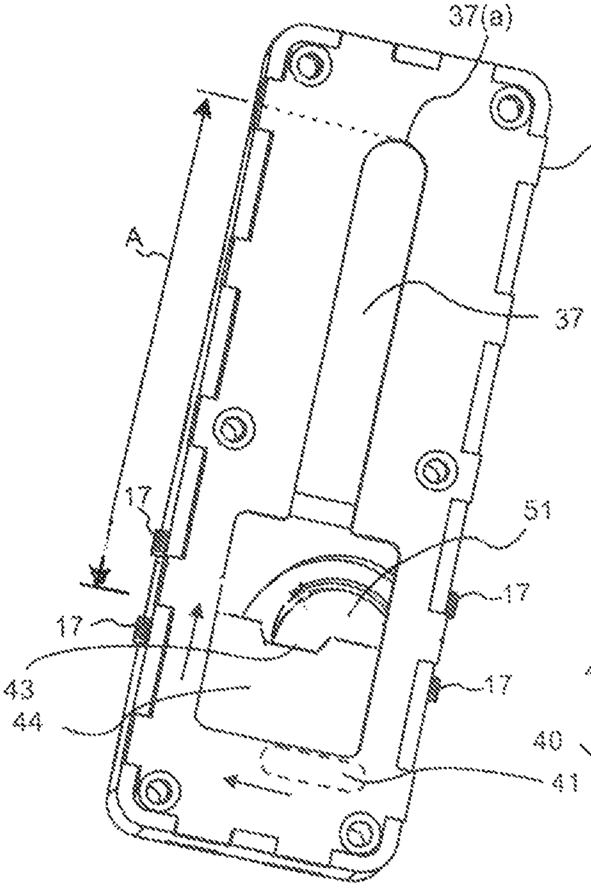

FIG. 8 illustrates a view of the bottom plate 30 superimposed against the top plate 10 (out of view), and further shows a portion of the mortise cylinder 51 installed into the top plate 10. The reinforcing brace 44 is shown in the unlocked configuration. In this configuration, the maximum dimension (A) of the channel cutout 37 is achieved, extending from the channel neck 37(*a*) to the top of the "flange" 43 of the reinforcing brace 44.

Figure 9:
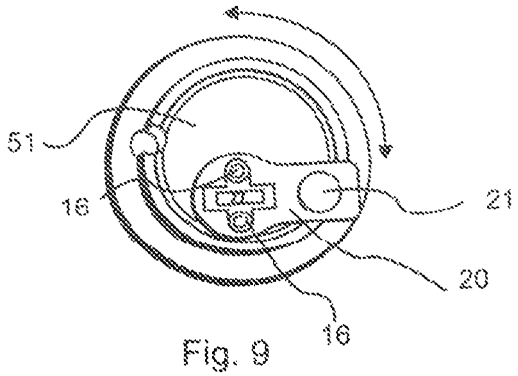

FIG. 9 depicts the position of the rod 21 of the tailpiece 20, the tailpiece 20 having been rotated by the mortise cylinder 51 (shown in FIG. 8) so as to cause the slide 40 and its connected reinforcing brace 44 to travel downward into the unlocked position.

Figure 10:
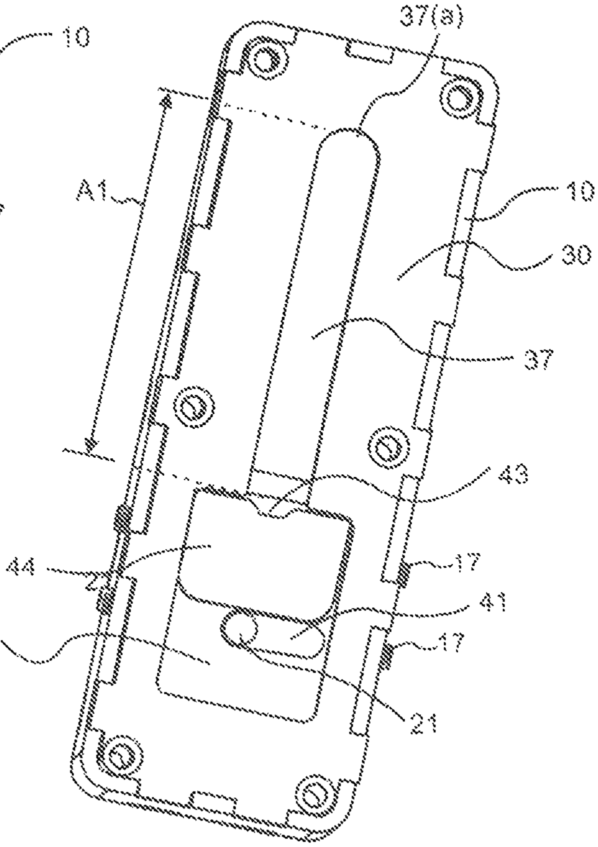

FIG. 10 illustrates the bottom plate 30 superimposed over the top plate 10 (out of view). The reinforcing brace 44 is shown in the locked configuration of the compartment 3. Also shown is an open, oblong slot 41 within the slide 40, wherein the illustrated position of the rod 21 indicates that the rod 21 has moved the slide 40 and the attached reinforcing brace 44 upwards to form the minimum dimension (A1) of the channel cutout 37.

Figure 11:
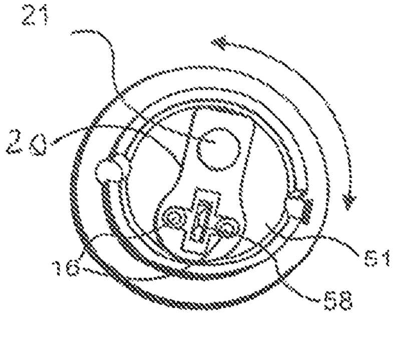

FIG. 11 depicts the position of the rod 21 of the tailpiece 20, the rod 21 having been rotated by the tailpiece 20 and mortise cylinder 51 (as shown in FIG. 8) forcing the rod 21 to move the slide 40 and its connected reinforcing brace 44 upwards into the locked configuration.

FIG. 12 is a three-dimensional frontal view of the controlling surface 20(*a*) of the tailpiece 20, showing the orthogonal attachment of the rod 21 to the tailpiece 20. Two machine screws 16 are inserted into apertures for attachment of the key way 58 of the mortise cylinder to the (unseen) opposite, abutting surface 20(*b*) of the tailpiece 20 (further shown in FIG. 9 and FIG. 11). A longitudinal junction aperture 22 in view is the portion of the tailpiece 20 through which the key way 58 for the control key 57 extends.

FIG. 13 depicts a typical cylinder head setscrew 17 with a knurled head 17(*a*) utilized for fastening into the sides of the housing 80.

FIG. 14 depicts a view of the outer surface of the reinforcing brace 44, being permanently affixed to the outer surface of the slide 40, Further shown is the oblong slot 41 which accommodates the rod 21 of the tailpiece 20. The flange 43 of the reinforcing brace 44 is also shown. The shown dimension labeled as 38(*b*) on the reinforcing brace 44, corresponds to the width of the bay cutout 38.

FIG. 15 depicts a view of the opposite side of that of FIG. 14. Shown is the inner surface of the slide 40, wherein the flange 43 of the reinforcing brace 44 is also shown. The crescent 45 of the slide 40 is slightly depressed so as to allow space for the lower shoulder 73(*b*) of the modified strike plate 70 to fit over the top portion of the flange 43 in the locked configuration of the compartment 3. In the fully locked configuration of the compartment 3, the flange 43 is also rigidly clamped against the bottom notch 72 of the modified strike plate 70, as shown in FIG. 1.

FIG. 16 depicts a view of the modified strike plate 70, further showing a bolt-hole 75, the upper shoulder 73(*a*) and its corresponding top notch 71, the lower shoulder 73(*b*) and the corresponding bottom notch 72, and the elongated lip 76. Two countersunk apertures 12 are in view, which are used to attach the modified strike plate 70 to the corresponding doorframe 68.

FIG. 17 is a profile view of the modified strike plate 70, as oriented by looking at FIG. 16 from left-to-right, parallel to the length of the modified strike plate 70. The upper shoulder 73(*a*), upper notch 71, elongated lip 76, inner faceplate 77, and outer faceplate 78 are shown. The modified strike plate 70 is pictured as attached to a doorframe 68.

Figure 18:
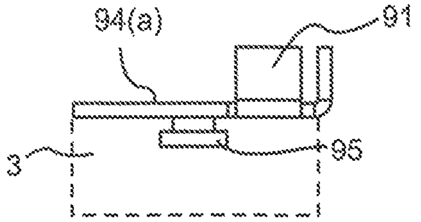

FIG. 18 pictures an overhead view of an embodiment of a hanger 90, further showing an integral pillar 95. The pillar 95 provides a rigid lengthwise mechanism against which the upper channel cutout 37 of the bottom plate 30 can be clamped for stowage of the compartment 3. The positioning of the compartment 3, when retained within upon hanger 90 is shown by dashed lines.

Figure 19:
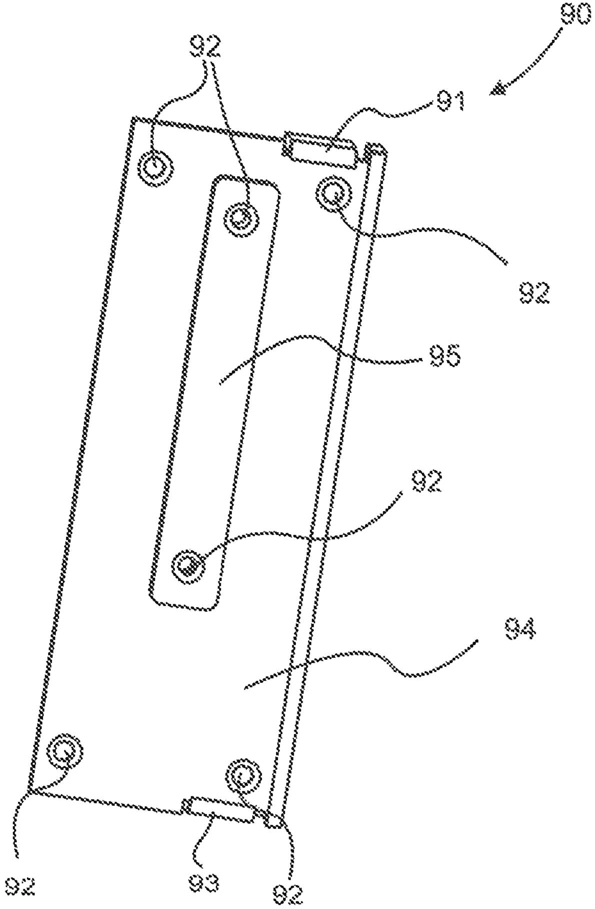

FIG. 19 depicts a view of the outside surface 94 of the hanger 90. The hanger may be attached to a corner structure, a desk, or a doorframe proximate the protecting door 60. As described, the pillar 95 provides a rigid mechanism about which the upper channel cutout 37 of the bottom plate 30 can be clamped for stowage of the compartment 3. Also shown is a plurality of attachment holes 92 for insertion of appropriate fasteners.

DETAILED DESCRIPTION OF THE INVENTION

The objects, features, and advantages of the inventive concept presented in this application are more readily understood when referring to the accompanying drawings. The drawings, totaling twenty-one figures, show the basic components and functions of embodiments and/or methods of use. In the several figures, like reference numbers are used in each figure to correspond to the same component as may be depicted in other figures.

The disclosed inventive concept, referred to as a Door Security Kit 1, comprises a door guard assembly 2, a compartment 3, a modified strike plate 70, and a compartment hanger 90. The Door Security Kit 1 is utilized to prevent a door, which is mounted in a metal doorframe 68, from being forcibly opened under hostile circumstances which threaten the safety of the occupants of a protected room 63.

FIG. 1 is a stylized view of the operation of a Door Security Kit 1 in which a modified strike plate 70 is attached to the doorframe 68 constructed within a wall 63 and having a supporting door stop 62. Further, the channel cutout 37 of the bottom plate 30 of the compartment 3 (the outline of which is shown by dashed lines) is depicted nearly in position to be placed about the top notch 71 and bottom notch 72 of the modified strike plate 70. A reinforcing brace

44 is vertically movable such that its flange 43 component will abut the bottom notch 72 of the modified strike plate 70 in the locked configuration.

A control key 57 (not shown) controls rotary movement of the mortise cylinder 51 such that the rod 21 moves a metal plate referred to as a slide 40, the slide 40 being permanently attached to the reinforcing brace 44.

The cuboid-shaped compartment 3 forms the external, reinforced component of the door security kit 1 (shown in FIG. 2, FIG. 2A, and FIG. 3). The compartment 3 consists of three basic parts: a housing 80, atop plate 10, and a bottom plate 30. The compartment 3 is fabricated using, in the preferred embodiment, SAE 304 stainless steel. The top plate 10 (shown in FIG. 5 and FIG. 6) manifests a circular opening 14 which permits compatible installation of a mortise cylinder 51 and associated spacers 50 (see FIG. 2, FIG. 2A). The bottom plate 30 features a vertically-oriented upper channel 37 which transitions into a substantially wider extension which forms a lower bay cutout 38 (shown in FIG. 7 and FIG. 7A). The compartment 3 works in conjunction with a modified metal strike plate 70. The modified strike plate 70 must be installed within a doorframe 68 which supports a door 60 leading to the "protected" room 63 which must be fortified from break-in.

Components interior to the compartment 3 comprise the door guard assembly 2 which functions to enable the secure locking of a protecting door 60. The door guard assembly 2 components include a mortise cylinder 51, a control key 57, a keyway 58, a cam-like tailpiece 20, having an orthogonally-attached rod 21, a slide 40, and a reinforcing, brace 44.

The modified strike plate 70, shown in detail in FIG. 16 and FIG. 17, is fabricated of SAE 304 stainless steel, and at least 0.125 inch thick. The modified strike plate 70 features a vertically-oriented elongated lip 76 which, when installed, protrudes outwardly, approximately 1 to 2 inches, from the doorframe 68 and into the protected room 60. This design feature is more readily seen in FIG. 1, and is also shown in FIG. 3. The modified strike plate 70 conforms to ASA and ANSI standards, and, in the preferred embodiment, is installed in a metal door frame 68 within which the door 60 is hung.

Again referring to FIG. 1, there is illustrated a view of the Door Security Kit 1, with the outline of its compartment 3 shown in dashed lines. The bottom plate 30 is illustrated in its operating context as seen from the perspective of a user in the process of enabling the clamping of the channel cutout 37 of the bottom plate 30 about the upper shoulder 73(*a*) and lower shoulder 73(*b*) (out of view) of the elongated lip 76 of the modified strike plate 70. The compartment 3 will then be locked onto the protruding lip 76 of the modified strike plate 70 by a user inserting a control key 57 into the mortise cylinder 51 and turning the control key 57 to the locked position.

FIG. 2 illustrates a head-on view of the outer surface 10(*a*) of the compartment 3, showing the outer surface 10(*a*) of the top plate 10, along with the mortise cylinder lock 51, and the control key 57 inserted. Also depicted are two cylinder-head set screws 17, which manifest interiorly-hidden knurled knobs 17(*a*) which help guide the slide 40 along its movement path parallel to the bottom plate 30. This guiding action is more readily understood in viewing FIG. 7A, FIG. 8, and FIG. 10.

FIG. 2A presents a cutaway side view of the compartment 3 as seen from the orientation of section lines A-A of FIG. 2. The compartment 3 is shown, with the mortise cylinder 51 having been rotated to the locked configuration. Further displayed is the door guard assembly 2, consisting of the mortise cylinder 51, the tailpiece 20 with its integral rod 21, and the slide 40. The elongated lip 76 of the modified strike plate 70 and its upper shoulder 73(*a*) are shown clamped by the channel cutout 37 (not in view) of the bottom plate 30 of the compartment 3, thereby rendering the locked condition of the compartment 3, safeguarding the protected room 63.

The reinforcing brace 44, permanently attached to the slide 40, is hidden from view by the inner surface of the bottom plate 30. The control key 57 has been turned, moving the slide 40 upward, toward the locked configuration of the compartment 3.

The exterior of the mortise cylinder 51 is also shown in FIG. 2 and FIG. 2A, as it fits within the circular aperture on the outer surface 10(*a*) of the top plate 10 of the compartment 3.

In viewing FIG. 3, there is depicted an overhead view of the subject door 60 as it approaches its fully closed position against a metal doorstop 62 and metal doorframe 68. The modified strike plate 70 is shown attached onto the doorframe 68, resulting in the elongated lip 76 protruding past the inner edge of the doorframe 68. A typical bolt 64, internal to the door 60, is shown in contact with the elongated lip 76 of the modified strike plate 70, as the door 60 approaches the closed position.

Referring to FIG. 3, once the protecting door 60 is fully closed, the compartment 3 will be positioned so as to abut the interior surface 67 of the protecting door 60 and simultaneously, the interior of the associated doorframe 68. Although not seen in FIG. 3, the upper channel cutout 37 of the compartment 3 will be placed onto the elongated lip 76 to effectuate the secure locking by the components of the door guard assembly 2. This condition is further displayed in FIG. 2A.

FIG. 4 illustrates an isolated perspective view of the housing 80 component of the compartment 3. The four from edges of the housing 80 are constructed with a continuous alternating pattern of front notches 81 and front ridges 82. Likewise, the four rear edges of the housing 80 a feature a continuous alternating pattern of rear ridges 82(*a*) and rear notches 81(*a*). Also shown in FIG. 4, on both sides of the housing 80, are two pairs of co-axial apertures 83 for the insertion of knurled cylinder-head set screws 17.

FIG. 5 displays a perspective view of the inner surface 10(*b*) of the top plate 10 component. As shown, the left and right edges of the top plate 10 feature a continuously alternating pattern of tabs 13 and side gaps 15. The upper edge of the top plate 10 manifests an upper gap 15(*a*) between two tabs 13 while the lower edge of the top plate 10 features a similarly-positioned lower gap 15(*b*) positioned between two tabs 13.

As can be understood, the upper gap 15(*a*), lower gap 15(*b*), and the sequenced tabs 13 and side gaps 15 of the top plate 10 fit precisely within the appropriate end notches 81(*b*), front notches 81, and front rear ridges 82 of the housing 80, respectively. These interconnected gaps, notches, and ridges serve to provide exceptional lateral edge strength to the compartment 3. The top plate 10 further manifests a left upper bolster 34(*a*), rigid upper bolster 34(*d*), left mid bolster 34(*b*), right mid bolster 34(*b*), left lower bolster 34(*c*), and right lower bolster 34(*f*).

Each of the aforementioned bolsters 34(*a*)-34(*f*) are constructed as cylindrical posts which are welded 35 onto their respective locations and further, each bolster 34(*a*)-(*f*) manifests internal threading, as shown. Machine screws are inserted through countersunk apertures 19 in the bottom plate 30 to fasten the bottom plate 30 (shown in FIG. 7 and FIG. 8) into the bolsters 34(*a*)-(*f*) of the top plate 10. FIG.

5 displays a circular opening 14 within which the mortise cylinder 51 is to be mounted.

FIG. 6 displays a perspective view of outer surface the top plate 10. The top plate 10, in the illustrated embodiment of FIG. 5 and FIG. 6, exhibits a bend creating a ten-degree slope between the upper face 10(*a*) and the lower face 10(*b*) of the top plate 10. A different embodiment of the compartment 3 may feature a continuous planar shape, with deletion of the bend of the top plate 10. In such an embodiment the left upper bolster 34(*a*) and the right upper bolster 34(*b*) will manifest a longer length, continuing to enable direct contact with the bottom plate 30 of the compartment 3. Both FIG. 5 and FIG. 6 also displays a circular opening 14 within which the mortise cylinder 51 is to be mounted.

FIG. 7 displays a view of the inner surface of the bottom plate 30 of the compartment 3. The bottom plate 30 is a planar, essentially rectangular-shaped item that is machined, around its perimeter, with a series of alternating tabs 31 and lateral hollows 32(*a*). Similar to other exterior components of the compartment 3, the edges of the bottom plate 30 manifest a continuous alternating pattern of tabs 31 and gaps, or "hollows" 32.

Similar to previous descriptions, the tabs 31 of the bottom plate 30 correspond, in dimensions and spacing, to the rear notches 81(*a*) of the housing 80, while the hollows 32 of the bottom plate 30 correspond, in dimensions and spacing, to the front ridges 82 and rear ridges 82(*a*) of the housing 80. In this manner, the bottom plate 30, when fitted and joined to the housing 80, provides a series of extremely, tight, interlocking lateral junctions.

The upper channel cutout 37, shown in FIG. 7, extends downward from its neck 37(*a*) to expand into a lower bay cutout 38, line bay cutout 38 comprises width dimensions 38(*b*) equivalent to the lateral dimensions of the reinforcement brace 44 of the slide 40. The upper channel cutout 37 manifests a neck 37(*a*) which, in operation, is clamped onto the top notch 71 of the modified strike plate 76. The lower bay cutout 38 manifests an upper travel limit 38(*a*) which corresponds to the upper travel limit of the reinforcing brace 44, as it moves upward attached to the slide 40. At this travel limit 38(*b*), the reinforcing brace 44 is stopped from further movement. This limit, in turn, places the flange 43 of the reinforcing brace 44 (see FIG. 14 and FIG. 15) in a fully clamped position against the lower bottom notch 72 of the modified strike plate 76, as shown in FIG. 1, FIG. 2A, and more readily, in FIG. 10.

FIG. 7A depicts an internal view of the housing 80, further showing the continuous pattern of alternating notches 81 and front ridges 82 of the front edges of the housing 80. As a means of further clarifying the relative positioning of components of the compartment 3, the rear edges of the housing 80 are shown placed in juxtaposition atop the bottom plate 30. Notably, there is shown the two co-axially paired sets of cylinder head setscrews 17, and their knurled edges 17(*a*) utilized for the purpose of guiding the movement planar slide 40 (not shown) once it is positioned up and down within the compartment 3. Further, the adjustably-sized channel cutout 37, its rounded neck 37(*a*), and the extended bay cutout 38 are shown. The reinforcing brace 44 (not shown), conjoined to the slide 40, has a width dimension corresponding to the width 38(*b*) of the bay cutout 38.

FIG. 8 illustrates a view of the bottom plate 30 superimposed against the top plate 10 (out of view), and further shows a portion of the mortise cylinder 51 installed into the top plate 10. The tail piece 20 (as shown in FIG. 9) has been rotated by the control key 57 (out of view) causing the rod 21 to push downward on the oblong slot 41 (shown by dashed lines), thereby moving the reinforcing brace 44 into the unlocked configuration of the compartment 3. ID this configuration, the maximum dimension (A) of the channel cutout 37 is achieved, extending from the channel neck 37(*a*) to the top "flange" 43 of the reinforcing brace 44, FIG. 9 depicts the position of the rod 21 of the tailpiece 20, the tailpiece 20 having been rotated by the key 58 of the mortise cylinder 51 so as to cause the slide 40 and reinforcing brace 44 to travel downward into the unlocked position (shown in FIG. 8) of the compartment 3. The rod 21 is continuously confined to the interior of the oblong slot 41, (more readily visible in FIG. 11).

In FIG. 10, as similar to FIG. 8, there is seen s a view of the bottom plate 30 located in close juxtaposition to the top plate 10 (out of view). The slide 40 and its permanently attached reinforcement brace 44 are shown having been manually positioned upward into the locked configuration of the compartment 3. This is due to a user having rotated the control key 57 clockwise (the direction of locking), causing the rod 21 of the tailpiece 20 to rotate, in a parabolic path, while sliding along the oblong slot 41, thereby pushing the oblong slot 41 upward. As a result, the entirety of the slide 40 glides in abutment to the surface of the bottom plate 30, necessarily forcing the reinforcement brace 44 and its sculpted flange 43 upward.

This repositioning of the slide 40 simultaneously places the restraining brace 44 in a position to form the minimum dimension (A) of the channel cutout 37, between the flange 43 of the restraining brace 44 and the neck 37(*a*) of the channel cutout 37. The slide 40, during its ongoing movement back-and-forth, is guided in close parallel proximation to the inner surface of the bottom plate 30 by means of four knurled heads 17(*a*) which are integral to the cylinder-head setscrews 17 (ref. FIG. 7A, FIG. 8, and FIG. 10).

This travel of the slide 40 and reinforcing brace 44, as shown in FIG. 10 renders the locked, secure configuration of the compartment 3. At this juncture, a user has turned the control key 57 clockwise, causing the slide 40 and its reinforcement brace 44 to diminish the length of the upper channel 37. This results in a locked configuration because the neck 37(*a*) and the flange 43 are forced to form a rigid, powerful, clamping force simultaneously upon the top notch 71 and bottom notch 72, respectively, of the modified strike plate 70.

The compartment 3 then becomes fully flush with the door 60 and doorframe 68. The resultant condition is that the locked door guard assembly 2 and the compartment 3 barricade the door 60 against all attempts to force or break the door 60 out of the doorframe 68. The locked configuration is the only configuration of the compartment 3 by which the control key 57 may be removed from the keyway 58.

FIG. 11 depicts the position of the rod 21 of the tailpiece 20, the tailpiece 20 having been rotated by turning of the control key 57 and the keyway 58 within the mortise cylinder 51 so as to cause the slide 40 and reinforcing brace 44 to travel upward into the locked position (shown in FIG. 10) of the compartment 3.

FIG. 12 is a three-dimensional direct frontal view of the controlling surface 20(*a*) of the tailpiece 20, further showing the rod 21, orthogonally and permanently attached to the controlling surface 20(*a*) of the tailpiece 20. Two machine screws 16 are inserted into apertures for attachment of the keyway 58 of the mortise cylinder 51. A longitudinal junction aperture 22 is the portion of the tailpiece 20 through which the key way 58 for the control key 57 extends. The second, or abutting surface 20(*b*) of the tailpiece moves abuttingly to the inner surface of the mortise lock 51 in locking and unlocking functions.

The knurled cylinder head setscrew 17 with a knurled head 17(*a*), utilized in fastening, through apertures 83, into the sides of the housing 80, are depicted in FIG. 13. The knurled heads 17(*a*), function so as to guide the movement of the slide 40 within the compartment 3, and specifically, in a sliding motion parallel to the bottom plate 30.

FIG. 14 shows a view of the outer surface of the reinforcing brace 44, being permanently affixed to the outer surface of the slide 40, Further shown is the open oblong slot 41 of the slide 40 proximate the lower edge of the reinforcing brace 44. The oblong slot 41 accommodates the rod 21 of the tailpiece 20. The flange 43 of the reinforcing brace 44 is also shown. The indicated dimension, 38(*b*), is the width of the reinforcing brace 44, which also corresponds to the width of the bay cutout 38.

FIG. 15 depicts a view of the slide 40 opposite to the side shown in FIG. 14, showing the inner, surface of the slide 40, wherein the flange 43 of the reinforcing brace 44 is again shown. Further, the crescent 45 of the slide 40 is also shown. The crescent 45 allows sufficient room to accommodate the lower shoulder 73(*b*) of the modified strike plate 70 when the compartment 3 of the door security kit 1 is in the locked configuration.

The flange 43 is the primary structural component used for adjusting the dimension of the channel cutout 37 whenever a user turns the control key 57, causing movement of the slide 40 and its corresponding reinforcing brace 44 and flange 43. The rod 21 of the tailpiece 20, during functional operation, travels from position 4104 to position 41(*b*) of the oblong slot 41, thereby moving the slide 40 up and down within the compartment 3, In the fully locked configuration, the flange 43 is clamped against the bottom notch 72 of the modified strike plate 70, as shown in FIG. 1.

FIG. 16 depicts a perspective view of the modified strike plate 70, further showing the bolt-hole 75, the upper shoulder 73(*a*) and corresponding top notch 71, the lower shoulder 73(*b*) and corresponding bottom notch 72, the elongated lip 76, and two countersunk apertures 12. FIG. 17 is a downward-looking profile view of the modified strike plate 70, where the upper shoulder 73(*a*), upper notch 71, inner faceplate 77, and outer faceplate 78 are shown. Two countersunk apertures 12 are in view, which are used to attach the modified strike plate 70 to the corresponding door 60.

The modified strike plate 70, shown in FIG. 16 and FIG. 17, is a critical component of the Door Security Kit 1. The modified strike plate 70 is constructed as a predominantly planar slab of metal, the slab 73 further defined by an inner faceplate 77 and an outer faceplate 78, as shown in FIG. 17. At a mutual edge of the inner faceplate 77 and the outer faceplate 78, an extension of both these surfaces curvilinearly forms a rounded, elongated lip 76. The elongated lip 76 is further comprised of an upper shoulder 73(*a*), a lower shoulder 73(*b*), a top notch 71, and a bottom notch 72, as shown in FIG. 1, FIG. 16, and FIG. 17 herein. Symmetrically machined through both the inner faceplate 77 and the outer faceplate 78 is a bolt-hole 75 for acceptance of a deadbolt 64 or latch-bolt.

The modified strike plate 70 must be mounted onto a metal door frame 68, so as to orient the longitudinal dimension of the elongated lip 76 parallel to the from edge of the protecting door 60. This arrangement, in turn, causes the lip 76 to protrude into the protected room 63. This arrangement is more readily understood by viewing FIG. 1 and FIG. 2A. The installation of the modified strike plate 70 also exposes the top notch 71 and bottom notch 72, which are integral to the elongated lip 76. In operation of the floor Security Kit 1, the first sequential step is for a user to place the upper channel 37 (shown in FIG. 1 and FIG. 3) and a portion of the bay cutout 38 of the bottom plate 30 of the compartment 3 onto the entirely of the length of the elongated lip 76 of the modified strike plate 70. The Door Security Kit 1 will not function as designed, without the specially-designed modified strike plate 70.

An overhead view of one embodiment of a hanger 90 is pictured in FIG. 18, further showing an integral pillar 95. The pillar 95 provides a rigid lengthwise mechanism against which the upper channel cutout 37 of the bottom plate 30 can be clamped for stowage of the compartment 3. The positioning of the compartment 3, when retained within upon hanger 90 is shown by dashed lines.

FIG. 19 depicts a perspective view of the outside surface 94 of the hanger 90. The hanger may be attached to a corner structure, a desk, or a doorframe proximate the protecting door 60. Once so attached, the channel cutout 37 of the compartment 3 may be clamped onto the pillar 95 of the hanger 90. Also shown are a plurality of attachment holes 92 for insertion of appropriate fasteners.

For rapid response to an immediately threatening situation at the protecting door 60, the hanger 90 should be mounted on the wall immediately adjacent to the doorframe 68 of the protecting door 60. As an operational feature to be noted, the control key 57 cannot be removed from the mortise cylinder 57 unless the door guard assembly 2 is in the locked position, that is, the upper channel cutout 37 is adjusted to its minimum dimension. A user may place the door guard assembly 2 on the modified ASA/ANSI strike plate 70 and allow the door guard assembly 2 to rest on the top notch 71 of the modified strike plate 70.

By design, the control key 57 cannot be removed from the keyway 58 unless the control key 57 is turned clockwise so as to place the locking plate 40 into the locked configuration. Once that is accomplished, the control key 57 is removable.

In summary, under extreme circumstances, where security and protection from the possible breaking of the door lock of a door 60 is necessary for human safety, the Door Security Kit 1 will provide crucial fortification. A user must first access the device compartment 3 from its stowed location, and ensure that the door guard assembly 2 is in the unlocked configuration. The user next places the adjustably-sized channel cutout 37 of the Door Security Kit 1 directly onto the modified strike plate 70 in the door jamb 62, then turn the control key 57 clockwise to establish the clamped, locked configuration of the Door Security Kit 1.

While preferred embodiments of the present inventive device have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, as described by the scope of the claims presented herein.

What is claimed is:

1. A door security kit for providing securement against attempts to force the opening of a door, which door is hingedly attached to a door jamb and opens into a protected room, the door security kit comprising:

(a) a modified strike plate having a bolt-hole, two counter-sunk apertures, and a faceplate having an elongated lip, the lip further comprising an upper shoulder forming a top notch, and a lower shoulder forming a bottom notch;

(b) a cuboid-shaped metallic compartment comprising the fitting together of (i) a hollow housing consisting of two parallel longitudinal walls and two parallel lateral walls, the walls further forming four front edges and four rear edges; (ii) a planar top plate having a circular opening and a plurality of threaded bolsters welded to the inner surface of the top plate, (iii) a planar bottom plate attachable to the top plate by machine screws passing through counter-sunk apertures to fasten into the plurality of bolsters of the top plate and (iv) an adjustably-sized upper channel cutout through the surface of the bottom platethe channel adjustable between a maximum length dimension and a minimum length dimension, the upper channel cutout transitioning to a rectangular-shaped bay cutout;

(c) a planar slide corresponding in width dimension to the width of the housing and having an open, oblong slot within the slide, oriented widthwise, the slide further having a planar reinforcing brace constructed with an uppermost flange, the reinforcing brace permanently affixed to a first surface of the planar slide, the reinforcing brace corresponding in width dimension to the interior width of the bay cutout;

(d) a mortise lock, having a corresponding keyway and key, the mortise lock affixed within the circumference of the circular opening of the top plate, so as to position the inner surface of the mortise lock interiorly to the compartment and expose the outer surface of the mortise lock exteriorly to the metallic compartment;

(e) a planar tailpiece having, on a controlling surface, a cylindrical rod projecting orthogonally therefrom, the cylindrical rod of a diameter corresponding to the width of the oblong slot within the slide; and (f) a plurality of machine screws and fasteners wherein (g) placing the key into the mortise lock and rotating the keyway in a first direction, causes the rod of the tailpiece to move within the oblong slide, forcing the slide to move in abutment to the inner surface of the bottom plate, whereby the flange of the reinforcing brace causes the maximum dimension, or unlocked configuration of the upper channel, while rotating the keyway in a second direction, renders the minimum dimension, or locked configuration, of the upper channel.

2. A door security kit for providing securement against attempts to three the opening of a door, which door is hingedly attached to a door jamb and opens into a protected room, the door security kit comprising:

(a) a modified strike plate having a bolt-hole, two counter-sunk apertures, and a faceplate having an elongated lip, the lip further comprising an upper shoulder forming a top notch, and a lower shoulder forming a bottom notch;

(b) a cuboid-shaped metallic compartment comprising the fitting together of (i) a hollow housing consisting of two parallel longitudinal walls and two parallel lateral walls, the walls further forming four front edges and four rear edges; (ii) a planar top plate having a circular opening and a plurality of threaded bolsters welded to the inner surface of the top plate, (iii) a planar bottom plate attachable to the top plate by machine screws passing through counter-sunk apertures to fasten into the plurality of bolsters of the top plate and (iv) an adjustably-sized upper channel cutout through the surface of the bottom plate the channel adjustable between a maximum length dimension and a minimum length dimension, the upper channel cutout transitioning to a rectangular-shaped bay cutout;

(c) a planar slide corresponding in width dimension to the width of the housing and having an open, oblong slot within the slide, oriented widthwise, the slide further having a planar reinforcing brace constructed with an uppermost flange the reinforcing brace permanently affixed to a first surface of the planar slide, the reinforcing brace corresponding in width dimension to the interior width of the bay cutout; and further, the upper edge of the slide is constructed with a depressed crescent, such that, in the locked configuration of the door security kit, the crescent provides clearance for the lower shoulder of the modified strike plate and (ii) the flange provides an immovable, rigid surface against the bottom notch of the modified strike plate, (d) a mortise lock, having a corresponding keyway and key, the mortise lock affixed within the circumference of the circular opening of the top plate, so as to position the inner surface of the mortise lock interiorly to the compartment and expose the outer surface of the mortise lock, exteriorly to the metallic compartment;

(e) a planar tailpiece having, on a controlling surface, a cylindrical rod projecting orthogonally therefrom, the cylindrical rod of a diameter corresponding to the width of the oblong slot within the slide; and (f) plurality of machine screws and fasteners, wherein (g) placing the key into the mortise lock and rotating the keyway in a first direction, causes the rod of the tailpiece to move within the oblong slot, forcing the slide to move in abutment to the inner surface of the bottom plate, whereby the flange of the reinforcing brace causes the maximum dimension, or unlocked configuration the upper channel, while rotating the keyway in a second direction, renders the minimum dimension, or locked configuration, of the upper channel.

3. A door security kit for providing securement against attempts to force the opening of a door, which door is hingedly attached to a door iamb and opens into a protected room, the door security kit comprising:

(a) a modified strike plate having a bolt-hole, two counter-sunk apertures, and a faceplate having an elongated lip, the lip further comprising an upper shoulder forming a top notch, and a lower shoulder forming a bottom notch;

(b) a cuboid-shaped metallic compartment comprising to ether of (i) a hollow housing consisting of two parallel-longitudinal walls and two parallel lateral walls, the walls further forming four front edges and four rear edges: (ii) a planar top plate having a circular opening and a plurality of threaded bolsters welded to the inner surface of the top plates (ill) a planar bottom plate attachable to the top plate by machine screws passing through counter-sunk apertures to fasten into the plurality of bolsters of the top plate and (iv) an adjustably-sized neper channel cutout through the surface of the bottom plate the channel adjustable between a maximum length dimension and a minimum length dimension, the upper channel cutout transitioning to a rectangular-shaped bay cutout;

(C) a planar slide corresponding in width dimension to the width of the housing and shaped as having an oblong slot oriented widthwise, the slide further having a planar reinforcing brace constructed with an uppermost flange the reinforcing brace permanently affixed to a first surface of the planar slide, the reinforcing brace further corresponding in width dimension to the interior width of the bay cutout; and further, the upper edge of the slide is constructed with a depressed crescent such that, in the locked configuration of the door security kit, a) the crescent provides clearance for the lower shoulder of the modified strike plate and (ii) the flange provides an immovable, rigid surface against the bottom notch of the modified strike plate, (d) a mortise lock, having a corresponding keyway and key, the mortise lock affixed within the circumference of the circular opening of the top plate, so as to position the inner surface of the mortise lock interiorly to the compartment and expose the outer surface of the mortise lock exteriorly to the metallic compartment, (e) a planar tailpiece having, on a controlling surface, a cylindrical rod projecting orthogonally therefrom, the cylindrical rod of a diameter corresponding the width of the oblong slot within the slide;

(f) two axially-aligned pairs of knurled, hexagonal-head setscrews inserted through apertures in opposite longitudinal walls of the housing at locations proximate the pathway of the slide, so as to guide the movement of the slide; and (g) a plurality of machine screws and fasteners, wherein (h) placing the key into the mortise lock and rotating the keyway in a first direction, causes the rod of the tailpiece to move within the oblong slot, forcing the slide to move in abutment to the inner surface of the bottom plate, whereby the flange of the reinforcing brace causes the maximum dimension, or unlocked configuration of the upper channel, while rotating the keyway in a second direction, renders the minimum dimension, or locked configuration, of the upper channel.

4. A door security kit for providing securement against attempts to force the opening of a door, which door is hingedly attached to a door jamb and opens into a protected room, the door security kit comprising:

(a) a modified strike plate having a bolt-hole, two counter-sunk apertures, and a faceplate having an elongated, rounded lip so as to provide gradual contact with the door bolt during closing motion of the door lip, the lip further comprising an upper shoulder forming a top notch, and a lower shoulder forming a bottom notch;

(b) a cuboid-shaped metallic compartment comprising the fitting together of (i) a hollow housing consisting of two parallel longitudinal walls and two parallel lateral walls, the walls further forming four front edges and four rear edges; (ii) a planar top plate having a circular opening and a plurality of threaded bolsters welded to the inner surface of the top plate, (iii) a planar bottom plate attachable to the top plate h machine screws passing through counter-sunk apertures to fasten into the plurality of bolsters of the top plate and (iv) an adjustably-sized upper channel cutout through the surface of the bottom plate the channel adjustable between a maximum length dimension and a minimum length dimension, the upper channel cutout transitioning to a rectangular shaped bay cutout;

(c) a planar slide corresponding in width dimension to the width of the housing and having an open, oblong slot oriented widthwise, the slide further having a planar reinforcing brace constructed with an uppermost flange, the reinforcing brace permanently affixed to a first surface of the planar slide, and the reinforcing brace corresponding in width dimension to the interior width of the bay cutout; and further, the upper edge of the slide is constructed with a depressed crescent, such that, in the locked configuration of the door security kit, (i) the crescent provides clearance for the lower shoulder of the modified strike plate and (ii) the flange provides an immovable, rigid surface against the bottom notch of the modified strike plate, (d) a mortise lock, having a corresponding keyway, and key, the mortise lock affixed within the circumference of the circular opening of the top plate, so as to position the inner surface of the mortise lock interiorly to the compartment and expose the outer surface of the mortise lock exteriorly to the metallic compartment;

(e) a planar tailpiece having, on a controlling surface, a cylindrical rod projecting orthogonally therefrom, the cylindrical rod of a diameter corresponding to the width of the oblong slot within the slide;

(f) two axially-aligned pairs of knurled, hexagonal-head setscrews inserted though apertures in opposite longitudinal walls of the housing at locations proximate the pathway of the slide, so as to guide the movement of the slide; and (g) a plurality of machine screws and fasteners wherein (h) placing the key into the mortise lock and rotating the keyway in a first direction, causes the rod of the tailpiece to move within the oblong slot, forcing the slide to move in abutment to the inner surface of the bottom plate, whereby the flange of the reinforcing brace causes the maximum dimension, or unlocked configuration of the upper channel, while rotating the keyway in a second direction, renders the minimum dimension, or locked configuration, of the upper channel.

5. A door security kit for providing securement against attempts to force the opening of a door, which door is hingedly attached to a door jamb and opens into a protected room, the door security kit comprising;

(a) a modified strike plate having a bolt-hole, two counter-sunk apertures and a faceplate having an elongated lip, the lip further comprising answer shoulder forming a top notch, and a lower shoulder forming a bottom notch;

(b) cuboid-shaped metallic compartment comprising the fitting together of a hollow housing consisting of (i) two parallel longitudinal walls, (ii) two parallel lateral walls, the walls further forming (ii) four front edges and four rear edges, (iv) a planar top plate having a circular opening and a plurality of threaded bolsters welded to the inner surface of the top plate, and (v) a planar bottom plate, the bottom plate attachable to the top plate by machine screws passing through counter-sunk apertures to fasten into the plurality of bolsters of the top plate;

(c) wherein (a) the four front edges of the housing are constructed with an alternating continuous pattern of front notches and front ridges and the four rear edges of the housing are constructed with an alternating continuous pattern of rear notches and rear ridges; (b) the left and right edges of the top plate manifest a continuously alternating pattern of tabs and side, gaps which correspond to the front notches and front ridges of the housing; and (c) the edges of the bottom plate manifest alternating tabs and hollows which correspond to the rear notches and rear ridges of the housing;

(d) an adjustably-sized upper channel cutout through the surface of the bottom plate the channel adjustable between a maximum length dimension and a minimum length dimension, the upper channel cutout transitioning to a rectangular-shaped hay cutout;

(e) a planar slide corresponding in width dimension to the width of the housing, the slide having an open, oblong slot oriented widthwise, the slide further having a planar reinforcing brace constructed with an uppermost flange the reinforcing brace permanently affixed to a first surface of the planar slide, the reinforcing brace corresponding in width dimension to the interior width of the hay cutout; and further, the upper edge of the slide is constructed with a depressed crescent, such that, in the locked configuration of the door security kit, (i) the crescent provides clearance for the lower shoulder of the modified strike plate and (ii) the flange provides an immovable, rigid surface against the bottom notch of the modified strike plate;

(f) a mortise lock, having a corresponding key, the mortise lock affixed within the circumference of the circular opening of the top plate, so as to position the inner surface of the mortise lock interiorly to the compartment and expose the outer surface of the mortise lock exteriorly to the metallic compartment;

(g) a planar tailpiece having, on a controlling surface, a cylindrical rod projecting orthogonally therefrom, the cylindrical rod of a diameter corresponding to the width of the oblong slot within the slide;

(h) two axially-aligned pairs of knurled, hexagonal-head setscrews inserted through apertures in opposite longitudinal walls of the housing at locations proximate the pathway of the slide, so as to guide the movement of the slide; and (i) a plurality of machine screws and fasteners, wherein (j) placing the key into the mortise lock and rotating the keyway in a first direction, causes the rod of the tailpiece to move within the oblong slot, forcing the slide to move in abutment to the inner surface of the bottom plate, whereby the flange of the reinforcing brace causes the maximum dimension, or unlocked configuration of the upper channel, while rotating the keyway in a second direction enders the minimum dimension, or locked configuration, of the upper channel.

6. The door security kit of claim 5, further having a wall- or desk-mountable stowage bracket comprising a plate having a top notch and a bottom notch, the dimensions and co-linear orientation of both notches corresponding to the top notch and bottom notch, respectively, of the modified strike plate, whereupon the compartment of the door security kit may be stowed in readiness.

7. A method of providing securement against the forced opening of a door to a protected room, the door being of the type hingedly and vertically attached interiorly to a doorframe, having an integral deadbolt or [a] spring bolt, and closed by means of the deadbolt or spring bolt latching into a strike plate mounted within the doorframe, the method comprising the following steps:

(a) removing the existing strike plate;

(b) installing, in place of the removed strike plate, a modified strike plate, the modified strike plate having a bolt-hole, two mounting holes, and a faceplate with an elongated lip, said elongated lip having a vertically-aligned upper shoulder and top notch, a vertically aligned lower shoulder and bottom notch, the modified strike plate further comprising a width dimension resulting in protrusion of the upper shoulder, lower shoulder, and elongated lip interiorly into the protected room;

(c) providing a cuboid metal compartment consisting of a four-walled, hollow housing, the housing further having a planar bottom plate which is constructed with an adjustably-sized upper channel cutout, connecting to a lower bay cutout, and a top plate having a circular opening and a plurality of interiorly-threaded holsters welded to the inner surface of the top plate;

(d) providing a door guard assembly internal to the compartment, comprising (i) a locking mortise cylinder affixed within the circular opening of the top plate, the mortise cylinder further having a keyway on a first surface, (ii) a planar tailpiece attached to the keyway of the locking mortise cylinder, (c) the tailpiece further having an orthogonally-mounted cylindrical rod, (iii) a planar reinforcing brace accommodated within the through-bay of the bottom plate, the reinforcing brace permanently attached to (iv) a slide, the slide further having an open, oblong slot of width corresponding to the diameter of the rod whereby the rod operably functions within the oblong slot;

(e) providing a control key for operation within the keyway of the locking mortise cylinder;

(f) providing a mechanical correlation by which turning of the control key of the locking mortise cylinder in a first direction moves the rod of the tailpiece within the oblong slot, causing the slide to travel within the compartment, thereby creating a maximum length dimension of the upper channel cutout, said dimension greater than the distance existing between the upper shoulder and lower shoulder of the modified strike plate;

(g) providing a mechanical correlation by which turning of the locking mortise cylinder by the control key in a second direction, opposite the first described direction, moves the rod in a parabolic pattern while confined within the oblong slot, causing the slide to travel within the compartment and form the minimum length dimension of the upper channel cutout, said dimension equal to the distance between the top notch and bottom notch of the modified strike plate;

h) upon closing of the door, placing the bottom plate of the compartment proximate the elongated lip of the modified strike plate so as to position the upper channel cutout about the upper shoulder and lower shoulder of the modified strike plate;

i) turning the control key within the locking mortise cylinder in the second direction, thereby creating a minimum length dimension of the upper channel cutout, whereupon a clamped, locked condition of the upper channel cutout of the compartment is established upon the modified strike plate, securing the protected door in an immovable position.

8. The door security kit of claim 7, further having a wall- or desk-mountable stowage bracket comprising a plate having a top notch and a bottom notch, the dimensions and co-linear orientation of both notches corresponding to the top notch and bottom notch, respectively, of the modified strike plate, whereupon the compartment of the door security kit may be stowed in readiness.

9. A method of providing securement against the forced opening of a door to a protected room, the door being of the type hingedly and vertically attached interiorly to a doorframe, having an integral deadbolt or spring bolt, and closed by means of the deadbolt or spring bolt latching into a strike plate mounted within the doorframe, the method comprising the following steps:

(a) removing the existing strike plate;

(b) installing, in place of the removed strike plate, a modified strike plate, the modified strike plate having a bolt-hole, two mounting holes, and a faceplate with an elongated lip, said elongated lip having a vertically-aligned upper shoulder and top notch, a vertically aligned lower shoulder and bottom notch, the modified strike plate further comprising a width dimension resulting in protrusion of the upper shoulder, lower shoulder, and elongated lip interiorly into the protected room;

(c) providing a cuboid metal compartment consisting of a four-walled, hollow housing, the housing further having a planar bottom plate which is constructed with an adjustably-sized upper channel cutout, connecting to a lower bay cutout, and a top plate having a circular opening and a plurality of interiorly-threaded bolsters welded to the inner surface of the top plate;

(d) providing a door guard assembly internal to the compartment, comprising (i) a locking mortise cylinder affixed within the circular opening of the top plate, the mortise cylinder further having a keyway on a first surface, (ii) a planar tailpiece attached to the keyway of the locking mortise cylinder, (c) the tailpiece further having, an orthogonally-mounted cylindrical rod, (ill) a planar reinforcing, brace accommodated within the through-hay of the bottom plate, the reinforcing brace permanently attached to (iv) a slide, the slide further having an open, oblong slot of width corresponding to the diameter of the rod whereby the rod operably functions within the oblong slot;

(e) providing, on the upper edge of the slide, a depressed crescent and constructing a flange on the top edge of the reinforcing brace, such that, in the locked configuration of the door security kit, (i) the crescent provides clearance for the lower shoulder of the modified strike plate and (ii) the flange provides an immovable, rigid surface against the bottom notch of the modified strike plate, (f) providing a control key for operation within the keyway of the locking mortise cylinder;

(g) providing a mechanical correlation by which turning of the control key of the locking mortise cylinder in a first direction moves the rod of the tailpiece within the oblong slot, causing the slide to travel within the compartment, thereby creating a maximum length dimension of the upper channel cutout, said dimension greater than the distance existing between the upper Shoulder and lower shoulder of the modified strike plate;

(h) providing a mechanical correlation in which turning of the locking mortise cylinder by the control key in a second direction, opposite the first described direction, moves the rod in a parabolic pattern while confined within the oblong slot, causing the slide to travel within the compartment and form the minimum length dimension of the upper channel cutout, said dimension equal to the distance between the top notch and bottom notch of the modified strike plate;

(i) upon closing of the door, placing the bottom plate of the compartment proximate the elongated lip of the modified strike plate so as to position the upper channel cutout about the upper shoulder and lower shoulder of the modified strike plate;

(j) turning the control key within the locking mortise cylinder in the second direction, thereby creating a minimum length dimension of the upper channel cutout, whereupon a clamped, locked condition of the upper channel cutout of the compartment is established upon the modified strike plate, securing the protected door in an immovable position.

10. A method of providing securement the forced opening of a door to protected room, the door being of the type hingedly and vertically attached interiorly to a doorframe, having an integral deadbolt or spring bolt, and closed by means of the deadbolt or spring bolt latching into a strike plate mounted within the doorframe, the method comprising the following steps:

(a) removing the existing strikes plate;

(b) installing, in place of the removed strike plate, a modified strike plate, the modified strike plate having a bolt-hole, two mounting holes, and a faceplate with an elongated, rounded lip, said elongated lip having a vertically-aligned upper shoulder and top notch, a vertically aligned lower shoulder and bottom notch, the modified strike plate further comprising a width dimension resulting in protrusion of the upper shoulder, lower shoulder, and elongated lip interiorly into the protected room;

(c) providing a cuboid metal compartment consisting of a four-walled, hollow housing, the housing further having a planar bottom plate which is constructed with an adjustably-sized upper channel cutout, connecting to a lower bay cutout, and a top plate having a circular opening, and a plurality of interiorly-threaded bolsters welded to the inner surface of the top plate;

(d) providing a door guard assembly internal to the compartment, comprising (i) a locking mortise cylinder affixed within the circular opening of the top plate, the mortise cylinder further having a keyway on a first surface, (ii) a planar tailpiece attached to the keyway of the locking mortise cylinder, (c) the tailpiece further having an orthogonally-mounted cylindrical rod, (iii) a planar reinforcing brace accommodated within the through-bay of the bottom plate, the reinforcing brace permanently attached to (iv) a slide, the slide further having an open, oblong slot of width corresponding to the diameter of the rod whereby the rod operably functions within the oblong slot;

(e) providing, on the upper edge of the slide, a depressed crescent and constructing a flange on the top edge of the reinforcing brace, such that, in the locked configuration of the door security kit, (i) the crescent provides clearance for the lower shoulder of the modified strike plate and (ii) the flange provides an immovable, rigid surface against the bottom notch of the modified strike plate, (f) providing two axially-aligned pairs of knurled, hexagonal-head setscrews, each pair for insertion outwardly through apertures in both longitudinal walls of the housing at locations to provide abutting guidance to the movement of the slide, (g) providing a control key for operation within the keyway of the locking mortise cylinder;

(h) providing a mechanical correlation by which turning of the control key of the locking mortise cylinder in a first direction moves the rod of the tailpiece within the oblong slot, causing the slide to travel within the compartment, thereby creating a maximum length dimension of the upper channel cutout, said dimension greater than the distance existing, between the upper shoulder and lower shoulder of the modified strike plate;

(i) providing a mechanical correlation in which turning of the locking mortise cylinder by the control key m a second direction, opposite the first described direction, moves the rod in a parabolic pattern while confined within the oblong slot, causing the slide to travel, within the compartment and form the minimum length dimension of the upper channel cutout, said dimension equal to the distance between the top notch and bottom notch of the modified strike plate;

(j) upon closing of the door, placing the bottom plate of the compartment proximate the elongated lip of the modified strike plate so as to position the upper channel cutout about the upper shoulder and lower shoulder of the modified strike plate;

(k) turning the control key within the locking mortise cylinder in the second direction, thereby creating a minimum length dimension of the upper channel cut-out, whereupon a clamped, locked condition of the upper channel cutout of the compartment is established upon the modified strike plate, securing the protected door in an immovable position.

* * * * *